United States Patent
Banez

[19]

[11] Patent Number: 5,842,361

[45] Date of Patent: *Dec. 1, 1998

[54] VEHICLE SECURITY DEVICE

[75] Inventor: Mark W. Banez, Youngstown, Ohio

[73] Assignee: Winner International Royalty Corporation, Sharon, Pa.

[ * ] Notice: The term of this patent shall not extend beyond the expiration date of Pat. No. 5,613,383.

[21] Appl. No.: 730,973

[22] Filed: Oct. 16, 1996

Related U.S. Application Data

[63] Continuation of Ser. No. 422,034, Apr. 14, 1995, Pat. No. 5,613,383, which is a continuation of Ser. No. 6,777, Jan. 21, 1993, abandoned.

[51] Int. Cl.[6] ................................................. B60R 25/02
[52] U.S. Cl. ............................... 70/209; 70/164; 70/166; 70/226; 74/558; 74/558.5
[58] Field of Search ............................... 70/209, DIG. 58, 70/225, 226, 424, 238, 211, 212, 178, 180, 259, 260, 158–173, 207, 237; 74/558, 558.5

[56] References Cited

U.S. PATENT DOCUMENTS

| | | | |
|---|---|---|---|
| D. 289,491 | 4/1987 | Johnson | D8/330 |
| D. 306,252 | 2/1990 | Johnson | D8/331 |
| 475,305 | 5/1892 | Follett . | |
| 1,044,387 | 11/1912 | Hodge . | |
| 1,142,780 | 6/1915 | Younger . | |
| 1,154,389 | 9/1915 | Fogalsang . | |
| 1,168,146 | 1/1916 | Barnes . | |
| 1,329,913 | 2/1920 | McGuire | 70/209 |
| 1,368,054 | 2/1921 | Recher . | |
| 1,388,691 | 8/1921 | Bergen . | |
| 1,395,532 | 11/1921 | Tilden . | |
| 1,661,447 | 10/1928 | Seng . | |
| 2,458,002 | 1/1949 | Kaskouras | 70/211 |
| 2,491,609 | 12/1949 | George | 74/552 |
| 2,662,961 | 12/1953 | Sargent | 219/19 |
| 3,063,304 | 11/1962 | Manning | 74/558 |
| 3,162,982 | 12/1964 | Monk . | |
| 3,274,851 | 9/1966 | Geller | 74/552 |
| 3,462,982 | 8/1969 | Moore | 70/209 |

(List continued on next page.)

FOREIGN PATENT DOCUMENTS

| | | | |
|---|---|---|---|
| 475489 | of 0000 | Australia . | |
| 562201 | 1/1983 | Australia . | |
| 1196791 | 11/1982 | Canada . | |
| 80893 | 6/1983 | European Pat. Off. . | |
| 919367 | 3/1947 | France . | |
| 2487275 | 1/1982 | France . | |
| 2520313 | 4/1982 | France . | |
| 2501134 | 9/1982 | France . | |
| 2580243 | 10/1986 | France . | |
| 389215 | 1/1924 | Germany . | |
| 684481 | 11/1939 | Germany . | |
| 801127 | 12/1959 | Germany . | |
| 2718291 | 10/1978 | Germany . | |
| 584555 | 10/1958 | Italy . | |
| 142638 | 9/1990 | Japan . | |
| 228807 | 8/1994 | Taiwan . | |
| 315961 | 7/1929 | United Kingdom | 70/211 |
| 361686 | 11/1931 | United Kingdom . | |
| 2037242 | 7/1980 | United Kingdom . | |
| 2110175 | 6/1983 | United Kingdom . | |
| 2206552 | 7/1988 | United Kingdom . | |
| 2263455 | 7/1993 | United Kingdom . | |
| WO92/04211 | 3/1992 | WIPO | 70/209 |

OTHER PUBLICATIONS

Box container of "The Cap" by Etc'cessoires.

*Primary Examiner*—Lloyd A. Gall
*Attorney, Agent, or Firm*—Vickers, Daniels & Young

[57] ABSTRACT

A motor vehicle security device for protecting against the cutting of an automobile steering wheel which includes a protective member made of cut-resistant material covering the steering wheel rim and a connector for attaching the protective member to the steering wheel rim. The protective member radially and circumferentially overlies the steering wheel rim to preclude access to the rim and protect against cutting of the rim.

50 Claims, 13 Drawing Sheets

U.S. PATENT DOCUMENTS

| | | | |
|---|---|---|---|
| 3,828,593 | 8/1974 | Bolton | 70/209 |
| 3,982,602 | 9/1976 | Gorman | 180/114 |
| 4,166,400 | 9/1979 | Manning et al. | 74/552 |
| 4,186,576 | 2/1980 | Means et al. | 70/233 |
| 4,327,601 | 5/1982 | Vivian, Jr. | 74/552 |
| 4,413,490 | 11/1983 | Nielsen, Jr. | 70/232 X |
| 4,738,127 | 4/1988 | Johnson | 70/209 |
| 4,777,811 | 10/1988 | Binkley et al. | 70/178 |
| 4,800,775 | 1/1989 | Iachi | 74/552 |
| 4,856,308 | 8/1989 | Johnson | 70/209 |
| 4,934,479 | 6/1990 | Usina | 180/287 |
| 4,935,047 | 6/1990 | Wu | 70/209 |
| 4,961,331 | 10/1990 | Winner | 70/209 |
| 5,007,259 | 4/1991 | Mellard | 70/209 |
| 5,031,429 | 7/1991 | Wang | 70/209 |
| 5,040,389 | 8/1991 | Beaudoin | 70/226 |
| 5,115,652 | 5/1992 | Starmer | 70/209 |
| 5,199,284 | 4/1993 | Lin | 70/209 |
| 5,214,944 | 6/1993 | Wolthoff | 70/226 |
| 5,275,030 | 1/1994 | Cole | 70/209 |
| 5,297,406 | 3/1994 | Lin | 70/209 |
| 5,301,527 | 4/1994 | Pollard | 70/226 |
| 5,353,614 | 10/1994 | Anderson | 70/209 |
| 5,381,679 | 1/1995 | Cummins | 70/209 |
| 5,415,018 | 5/1995 | Ferrante | 70/209 |
| 5,431,033 | 7/1995 | Barrett | 70/209 |
| 5,454,240 | 10/1995 | Whitney | 70/209 |
| 5,454,243 | 10/1995 | Impastato | 70/228 |
| 5,461,891 | 10/1995 | Noel | 70/18 |
| 5,463,885 | 11/1995 | Warren, Sr. | 70/18 |
| 5,537,847 | 7/1996 | Dalton et al. | 70/209 |
| 5,540,067 | 7/1996 | Kim | 70/209 |
| 5,548,983 | 8/1996 | Hart | 70/209 |
| 5,613,383 | 3/1997 | Banez | 70/209 |
| 5,619,873 | 4/1997 | Wood . | |

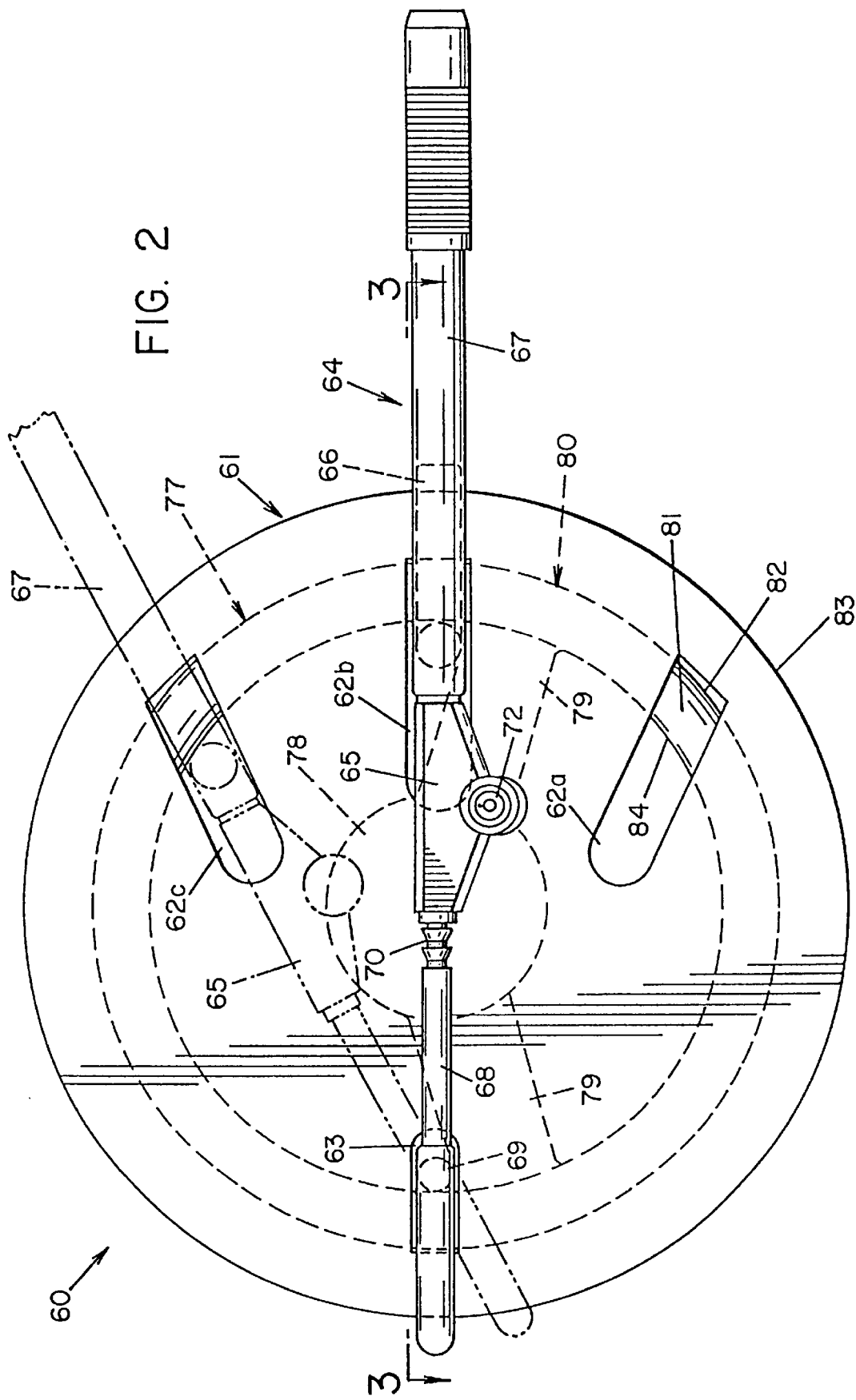

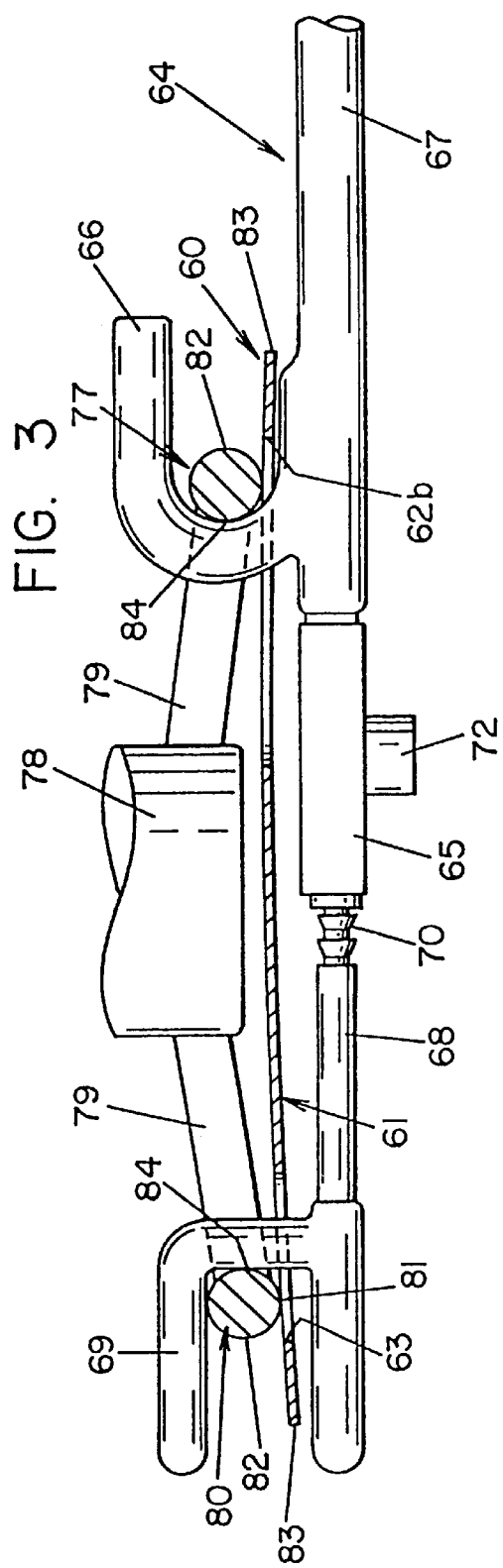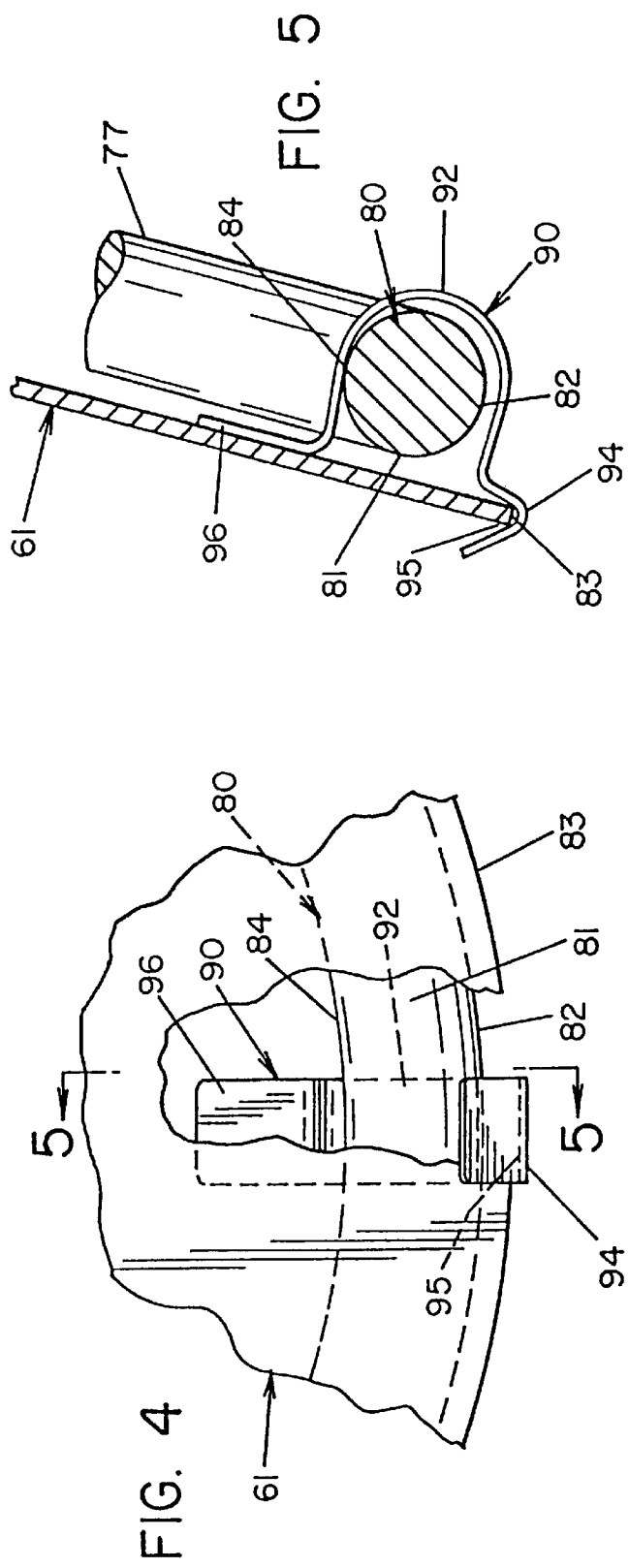

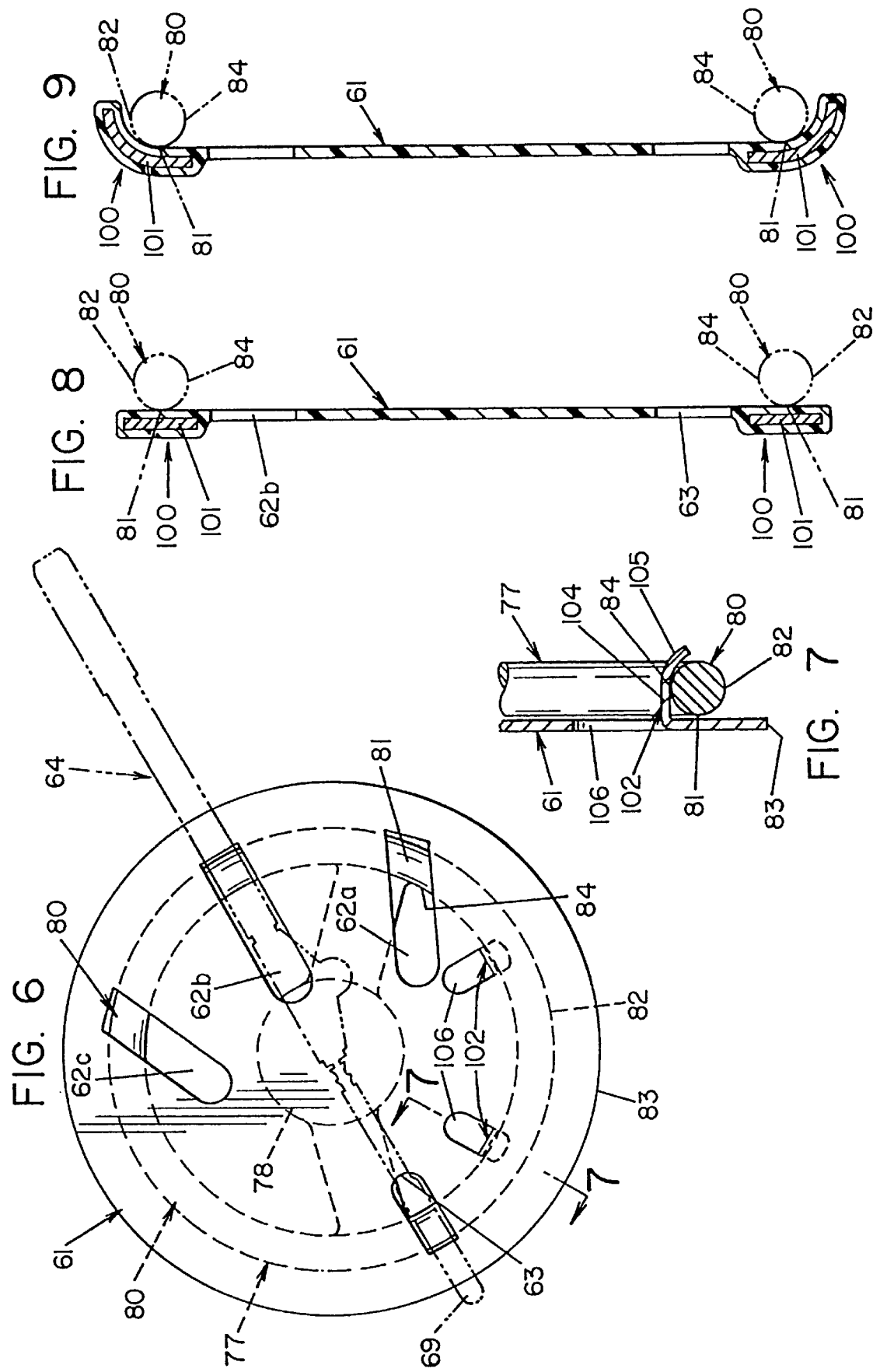

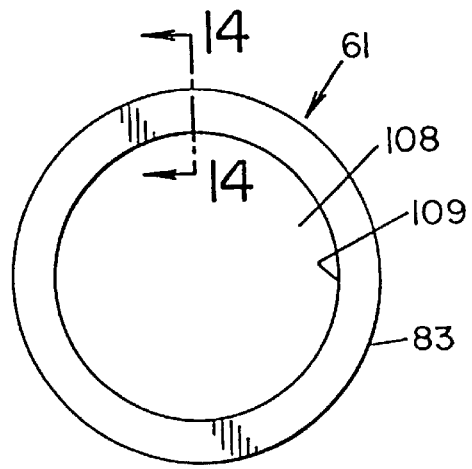
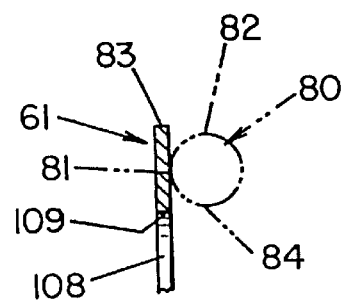
FIG. 13
FIG. 14
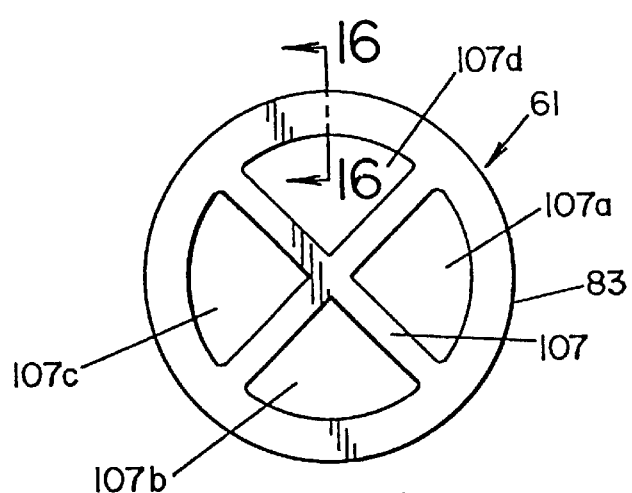
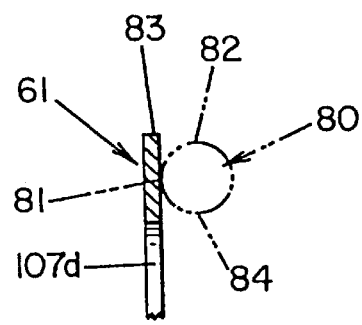
FIG. 15
FIG. 16
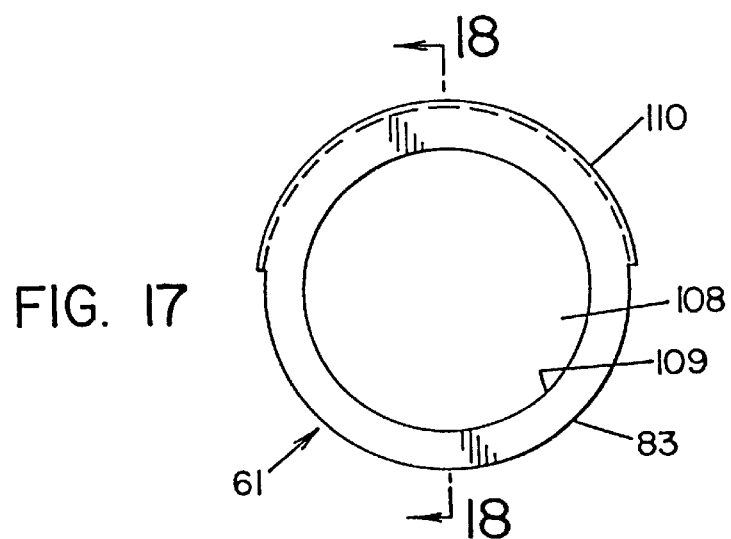
FIG. 17

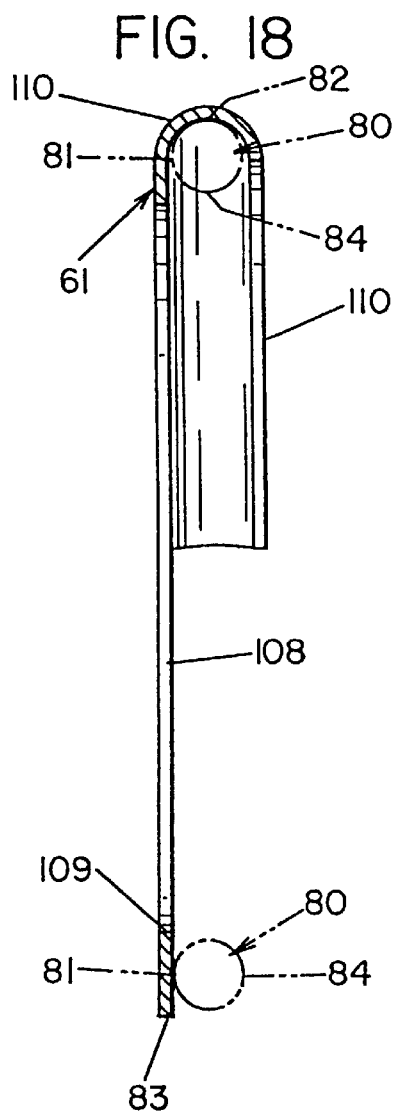
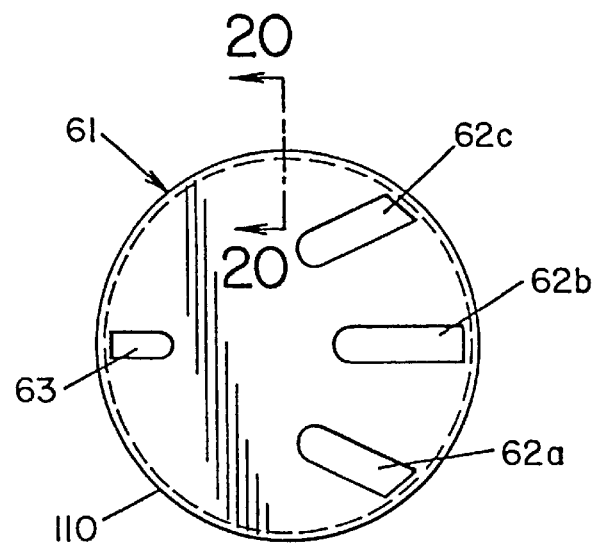
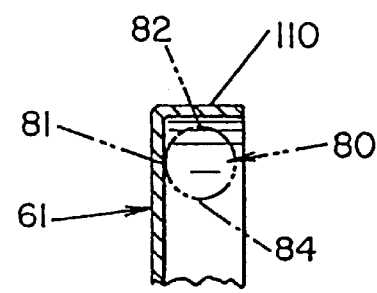
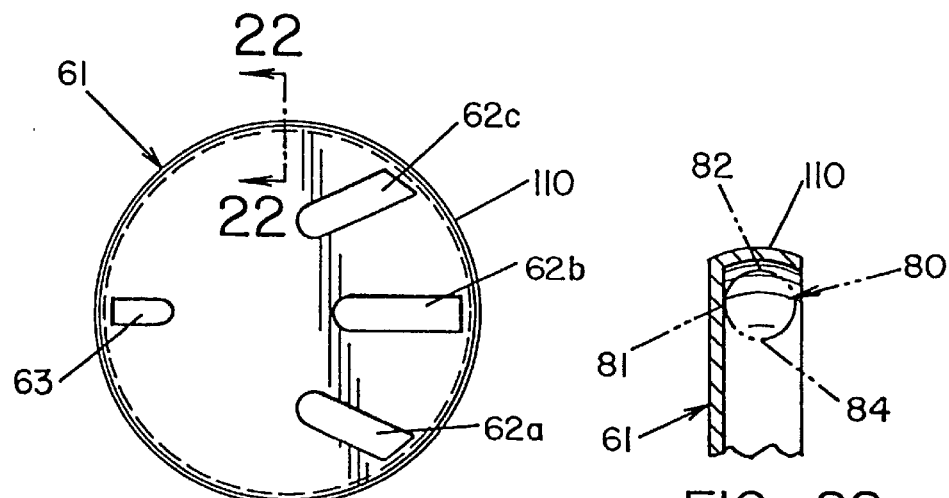
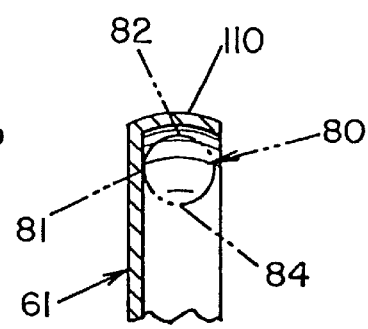

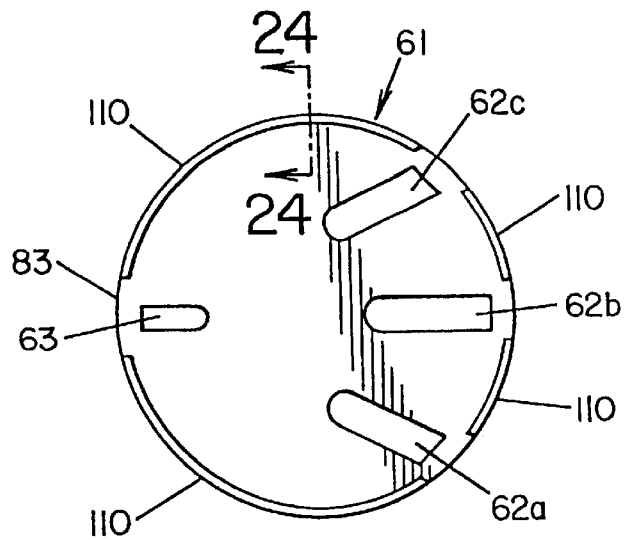
FIG. 23
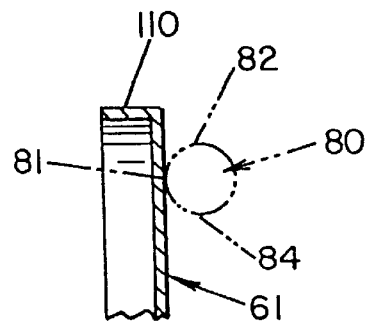
FIG. 24
FIG. 25
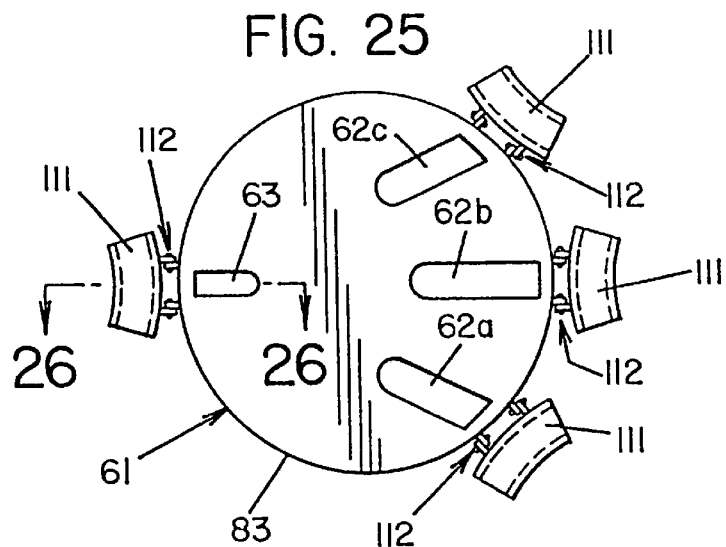
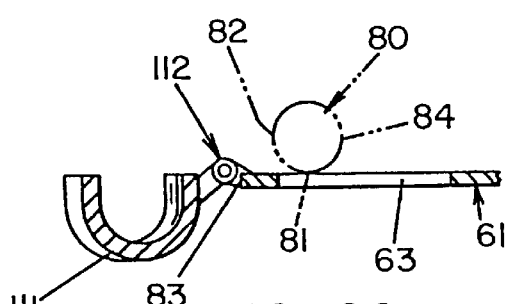
FIG. 26
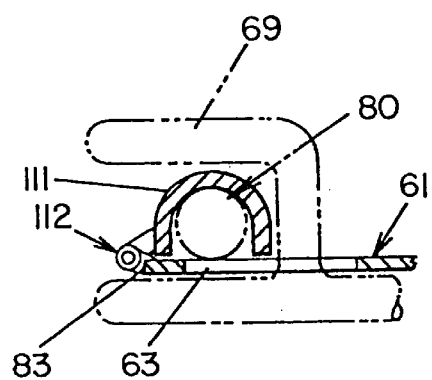
FIG. 27

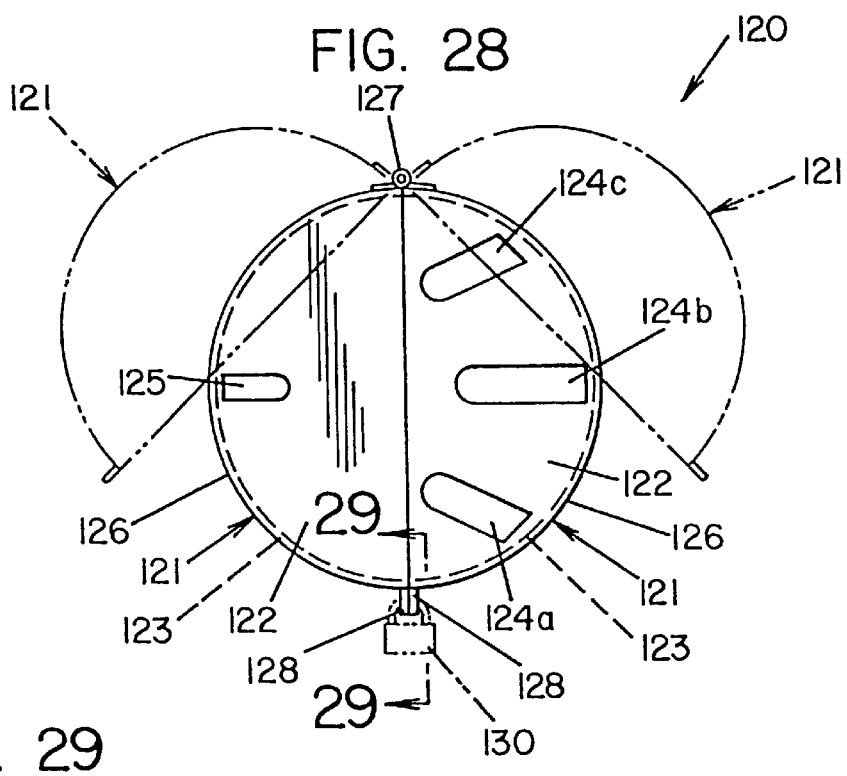
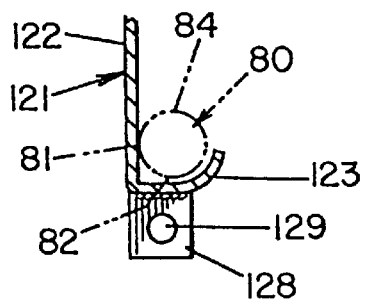
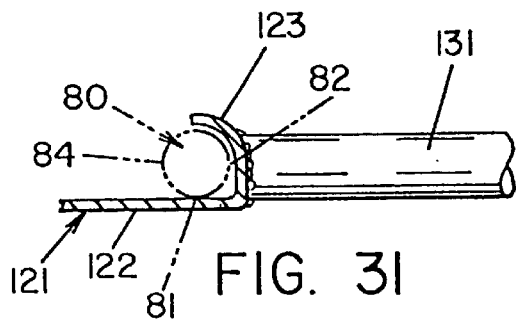
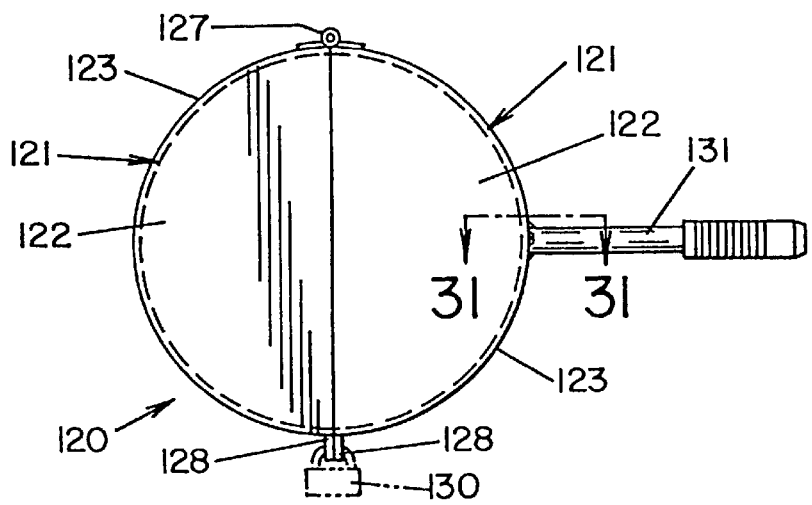

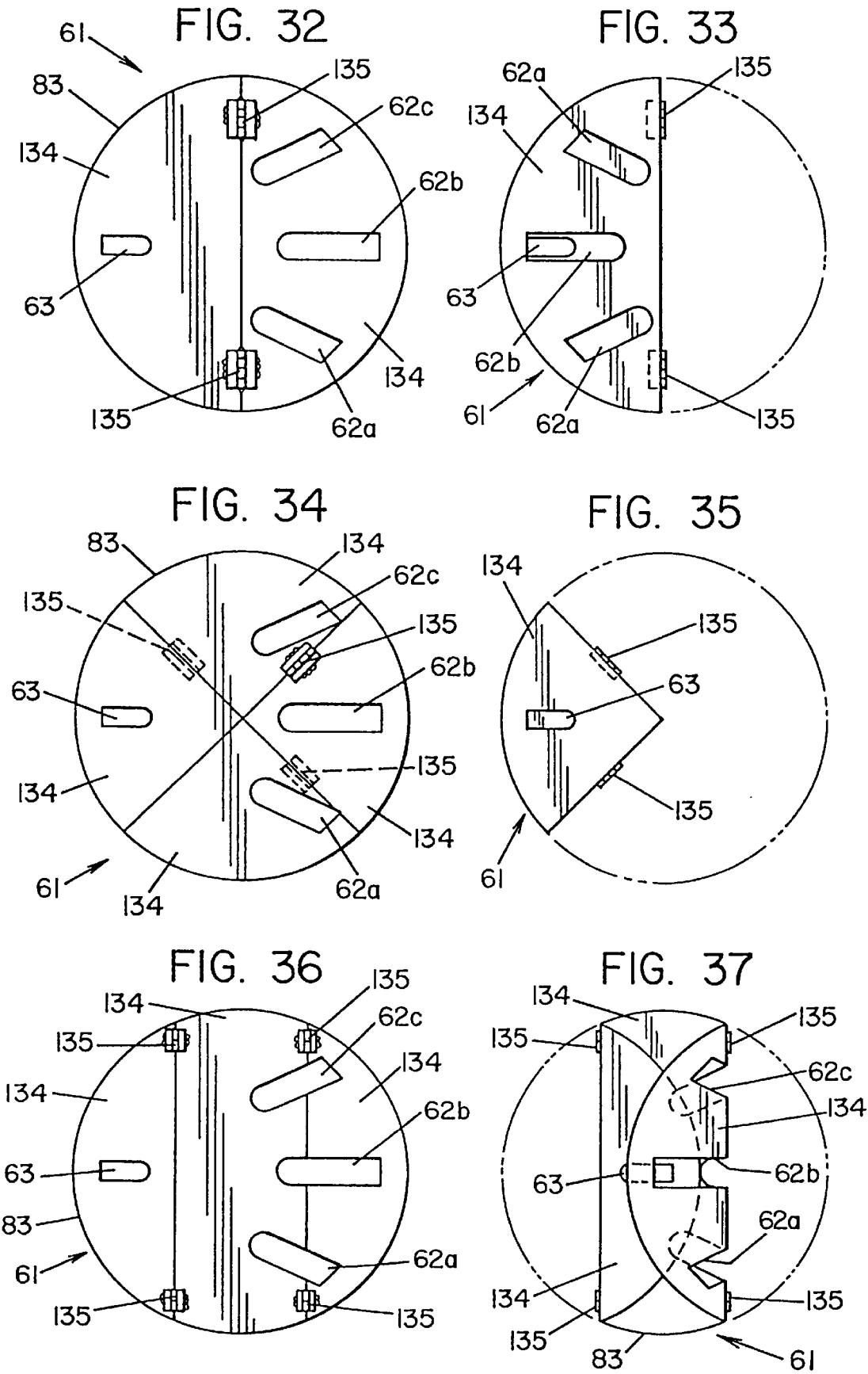

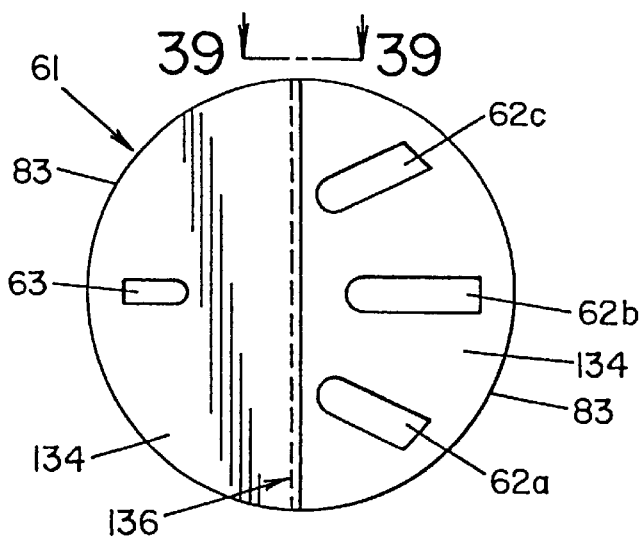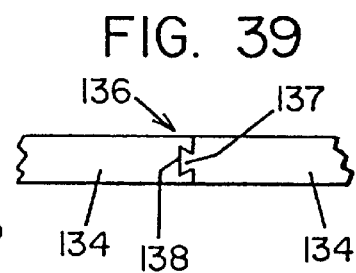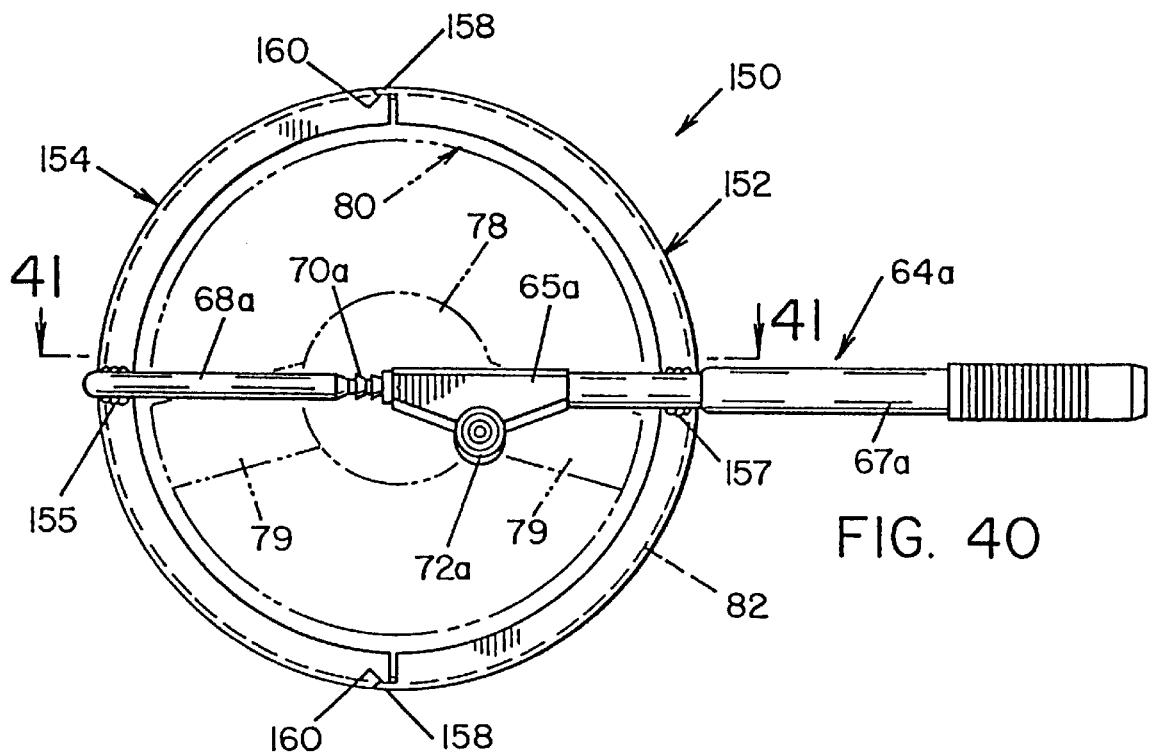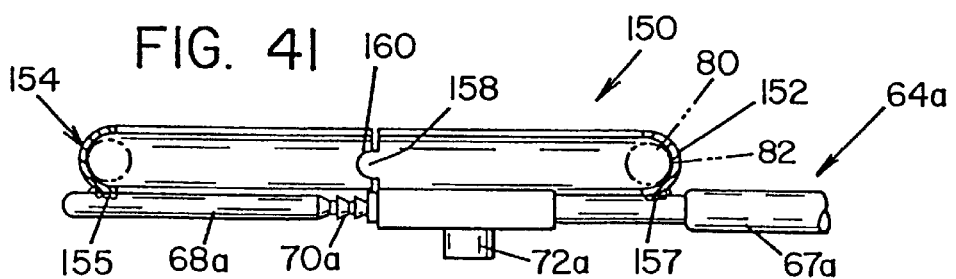

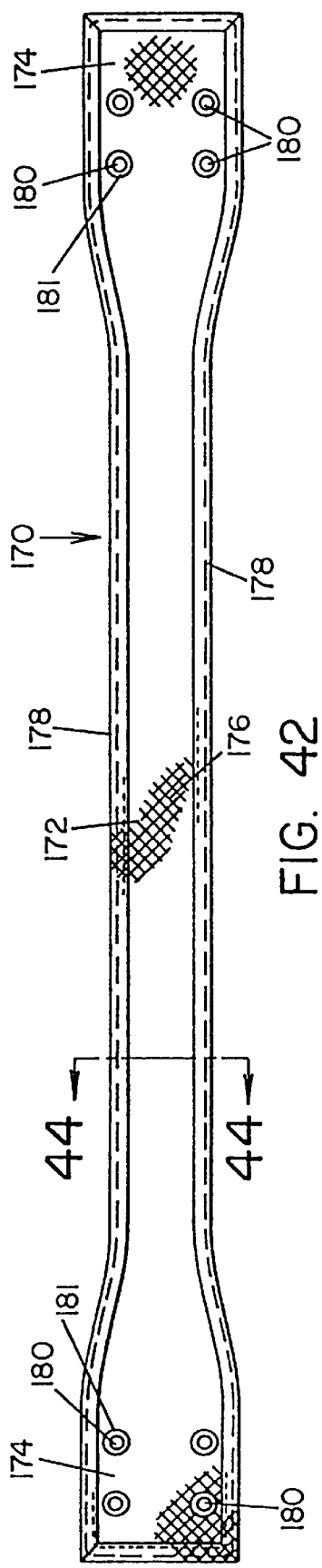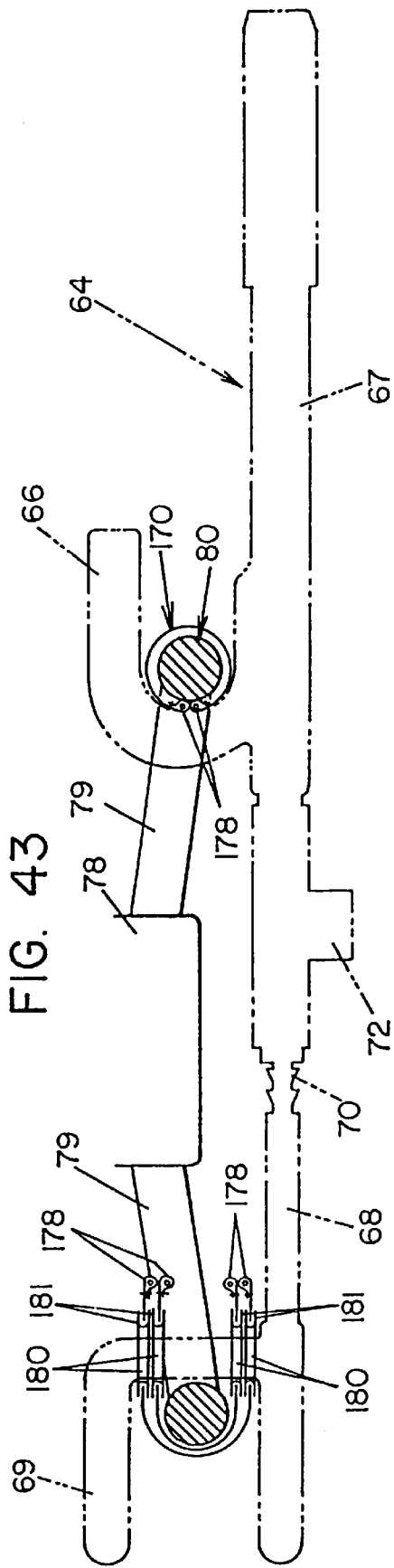

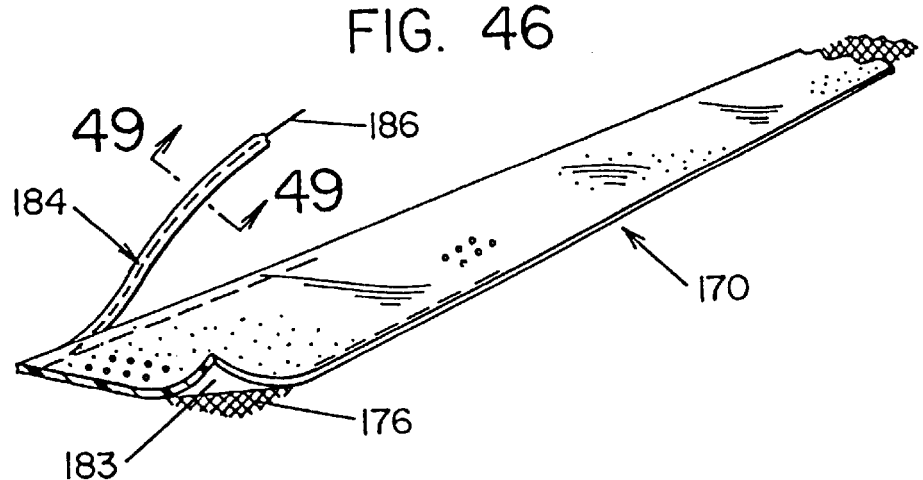
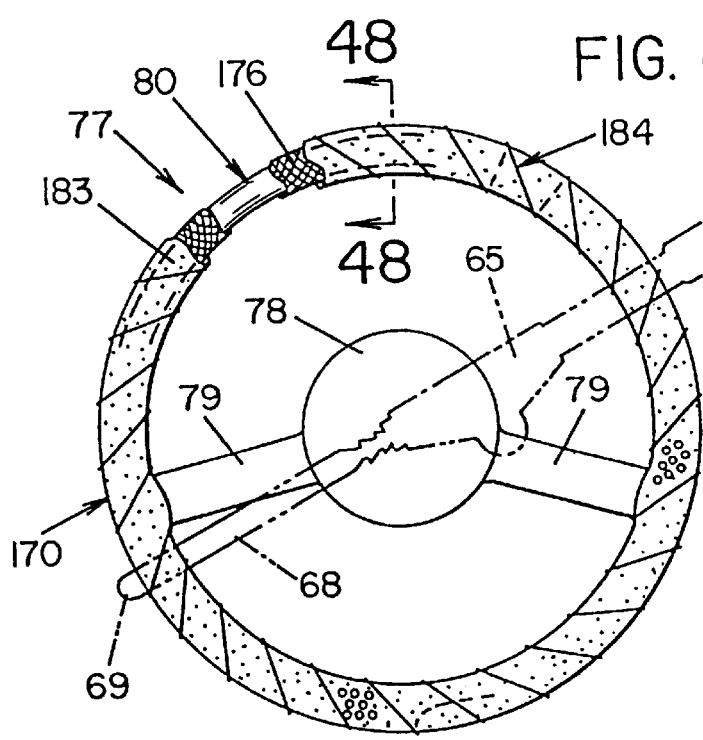
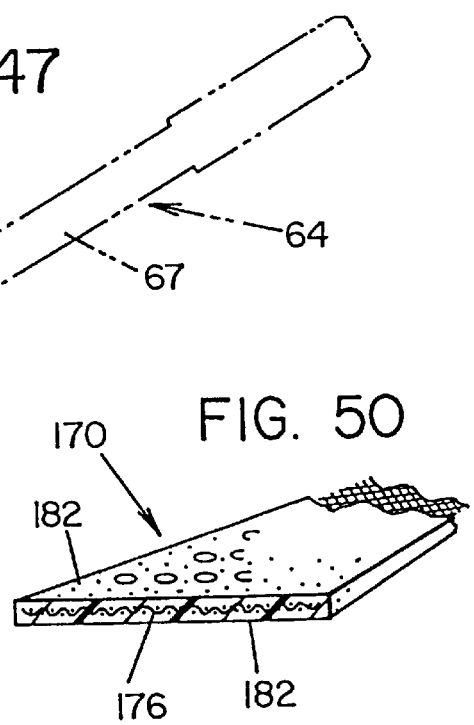
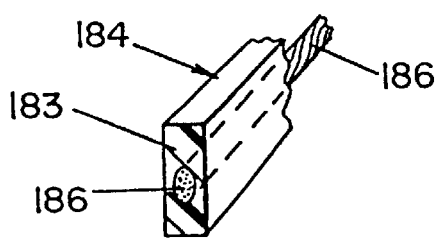
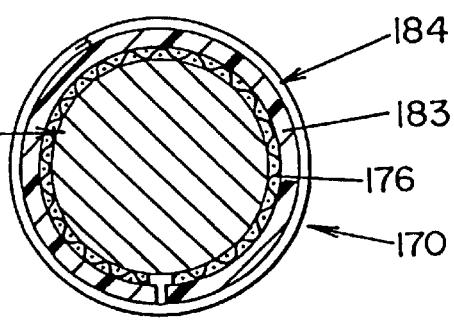

VEHICLE SECURITY DEVICE

The present application is a continuation application of application Ser. No. 08/422,034, filed Apr. 14, 1995, and issued as U.S. Pat. No. 5,613,383 on Mar. 25, 1997 which is a continuation application of application Ser. No. 08/006,777, filed Jan. 21, 1993, which application is now abandoned.

The present invention relates to the art of anti-theft devices for motor vehicles and, more particularly, to a vehicle security device which protects against unauthorized operation and theft of the vehicle by limiting access to the steering wheel.

INCORPORATION BY REFERENCE

U.S. Pat. No. Des. 289,491 dated Apr. 28, 1987; U.S. Pat. No. 4,738,127 dated Apr. 19, 1988; U.S. Pat. No. 4,856,308 dated Aug. 15, 1989; U.S. Pat. No. Des. 306,252 dated Feb. 27, 1990; U.S. Pat. No. 4,935,047 dated Jun. 19, 1990; and U.S. Pat. No. 4,961,331 dated Oct. 9, 1990 are incorporated by reference herein and illustrate types of mechanical security devices which are a part of or can be used in conjunction with the present invention.

BACKGROUND OF THE INVENTION

Over the past several years, there has been a growing demand by vehicle owners to better secure their vehicles against theft. Factors such as inconveniences and insurance premiums associated with the theft of a vehicle have resulted in a demand for mechanisms to better secure a vehicle. In an effort to solve these security problems and demands, a substantial industry has been developed to manufacture and promote various mechanisms which deter theft of a vehicle. Common vehicle security mechanisms include electronic devices such as alarms and so called "killer" switches which disable the engine and/or ignition of a vehicle unless by-passed by the authorized operator. Mechanical devices such as steering wheel locks, which inhibit unauthorized operation of the vehicle by constraining the steering wheel against rotation when locked in position, are also available. However, all these vehicle security systems suffer from numerous disadvantages in terms of cost, convenience and effectiveness.

Electronic alarms for motor vehicles have become well known in recent years and also have many disadvantages associated with their use. Such alarms are designed to be highly sensitive to physical force and/or motion and activate the alarm when the vehicle is disturbed in any way. Consequently, such alarms are frequently activated accidentally by parking lot and service station attendants and/or the owners themselves who neglect to deactivate the alarm system. The electronic alarms are also prone to malfunction and tend to drain the battery of the vehicle. Finally, many of these electronic alarms require professional installation, which is of high cost to a purchaser.

So called "killer" switches have also become popular in recent years. These switches serve to disable the vehicle usually at the ignition system, unless the authorized operator deactivates the killer switch. These types of systems are very costly and suffer from the usual reliability problems associated with electronic devices carried on a motor vehicle. In addition, these devices require professional retailers to install the device after the vehicle leaves the manufacturing plant for a substantial labor charge, since many of these systems are too complex for the general public to self-assemble. In addition, due to the complexity of these systems, a typical motorist is not knowledgeable regarding the deactivation of the system in case of a malfunction.

Vehicle security systems also include mechanical anti-theft devices which restrain relative movement of various components within the vehicle such as a steering wheel, gas pedal, clutch or brake. Many of these mechanical designs include mechanical locks comprising a pair of hooks at opposite ends of an elongated locking apparatus whereby the hooks are engaged to the steering wheel rim or the steering wheel rim and another component within the vehicle. These mechanical locks provide vehicle security without the cost and complexity of electronic security systems and further provide the convenience of being usable selectively at the discretion of the motorist, as opposed to being an ever present fixture of the vehicle which must inconveniently be attended to every time the vehicle is operated. Nevertheless, mechanical locks positioned on the steering wheel or on the steering wheel and another component of the vehicle suffer from various short comings which essentially reduce their effectiveness. The hooks and locks are typically made of hardened steel which resists bending, cutting or prying. While the mechanical locks themselves are relatively indestructible and unremovable by a thief, a thief can bypass such a security system by cutting through the steering wheel rim and removing the mechanical security device. A reinforced steering wheel, which resists being cut, can be installed; however, such steering wheel systems require professional installation and can be very expensive. Furthermore, certain vehicles are equipped with specially designed steering wheels that include various features, such as light switches and cruise control switches. These specially designed steering wheels cannot be replaced by a generic reinforced steering wheel.

The prior art is thus seen to fail to provide a vehicle security device which is economical, simple, and convenient to use and yet which is thoroughly effective in preventing theft of a vehicle.

SUMMARY OF THE INVENTION

The present invention overcomes the above-described disadvantages and others and provides a vehicle security device which is inexpensive, convenient and effective in protecting against theft of a motor vehicle.

In accordance with the principal feature of the present invention, there is provided a vehicle security device for protecting against the cutting of an automobile steering wheel wherein the steering wheel includes a rim having an outer edge. The security device includes a protective member made of cut-resistant material which covers the steering wheel rim, and a connector for attaching the protective member to the steering wheel rim. The connector can be part of the protective member or be a separate arrangement used in conjunction with the protective member. The protective member preferably radially and circumferentially overlies at least the steering wheel rim to preclude access to the rim and protect against the cutting of the rim. The protective member can be designed to partially or completely cover the entire steering wheel including the hub and spokes thereof. The protective member can be coated with a material to reduce any type of damage to the steering wheel or vehicle.

In accordance with another aspect of the invention, there is provided a vehicle security device connected to the steering wheel of a motor vehicle which protects the steering wheel rim from being cut and which, alone or together with a cooperative anti-theft device, limits rotation of the steering wheel.

In accordance with yet another aspect of the present invention, the protective member has at least one opening to enable use of a mechanical security device, such as those disclosed in the aforementioned patents incorporated herein by reference, as the connection device to secure the protective member to the steering wheel while, at the same time, preventing the complete rotation of the steering wheel.

In accordance with another aspect of the invention, the protective member has reinforced and/or extended surfaces adjacent to the rim of the steering wheel to provide additional protection against the severing of the steering wheel rim. In this respect, for example, the protective member includes a plate portion which overlies the steering wheel rim and has an outer peripheral edge. The plate portion can be provided with an embedded reinforcement, and/or the peripheral edge can be provided with a flange extending from the edge at an angle to the plane of the plate. The flange can partially or completely surround the outer edge of the rim to provide additional protection to the steering wheel and, in certain embodiments, can support and/or attach the protective member to the steering wheel. The protective member can also be provided with tabs extending at an angle to the plane of the plate to support the protective member on the steering wheel prior to and following attachment.

In accordance with yet another aspect of the present invention, the protective member is divided into at least two sections and has at least one joiner which connects the sections together. The protective member can include a lock arrangement to secure the plate sections together on the steering wheel rim. The multiple plate sections of the protective member allow for convenient storage and/or easy connection to the steering wheel.

In accordance with another aspect of the present invention, the protective member includes a radial protrusion which prevents rotation of the steering wheel when the protective member is connected to the steering wheel. The radial protrusion is also made of a material that resists cutting.

The principal object of the present invention is to provide a security device which, alone or in combination with a cooperative anti-theft device, protects a motor vehicle against theft.

Another object of the present invention is to provide a vehicle security device which is economical and convenient to use.

Yet another object of the invention is to provide a vehicle security device which enables a steering wheel to resist vandalism and to protect against the removal of a second security device attached thereto.

Still another object of the present invention is to provide a vehicle security device which cooperates with a second security device connected to the steering wheel to protect against the removal of the second security device from the steering wheel.

Another object of the invention is to provide a vehicle security device which alone or together with a second security device prevents rotation of the steering wheel.

Still another object of the present invention is to provide a vehicle security device which limits access to the rim of the steering wheel to prevent cutting or severing of the rim.

Yet another object of the present invention is to provide a vehicle security device which can be easily and conveniently stored when not in use.

BRIEF DESCRIPTION OF THE DRAWINGS

The foregoing and other objects of the invention will become apparent from the following description of the preferred embodiments thereof taken together with the accompanying drawings in which:

FIG. 2 is a plan view of the vehicle security device shown in FIG. 1;

FIG. 3 is a cross-sectional view taken along line 3—3 in FIG. 2;

FIG. 4 is a plan view, partially in section, of a portion of a security device in accordance with the present invention and showing a support member for the device;

FIG. 5 is a cross-sectional view taken along line 5—5 in FIG. 4;

FIG. 6 is a plan view of another embodiment of a vehicle security device in accordance with the present invention;

FIG. 7 is a cross-sectional elevation view taken along line 7—7 in FIG. 6;

FIGS. 8 and 9 are cross-sectional views of further embodiments of vehicle security devices in accordance with the present invention;

FIG. 13 is a plan view of another embodiment of a vehicle security device in accordance with the invention;

FIG. 14 is a cross-sectional view taken along line 14—14 in FIG. 13;

FIG. 15 is a plan view of still another embodiment of a vehicle security device in accordance with the invention;

FIG. 16 is a cross-sectional view taken along line 16—16 in FIG. 15;

FIG. 17 is a plan view of yet another embodiment of a vehicle security device in accordance with the present invention;

FIG. 18 is a cross-sectional view taken along line 18—18 in FIG. 17;

FIG. 19 is a plan view of still another embodiment of a vehicle security device in accordance with the present invention;

FIG. 20 is a cross-sectional view taken along line 20—20 in FIG. 19;

FIG. 21 is a plan view of another embodiment of a vehicle security device in accordance with the present invention;

FIG. 22 is a cross-sectional view taken along line 22—22 in FIG. 21;

FIG. 23 is a plan view of still another embodiment of a vehicle security device in accordance with the present invention;

FIG. 24 is a cross-sectional view taken along line 24—24 in FIG. 23;

FIG. 25 is a plan view of yet another embodiment of a vehicle security device in accordance with the present invention and showing attachment members in open positions relative to the steering wheel rim;

FIG. 26 is a cross-sectional view taken along line 26—26 in FIG. 25;

FIG. 27 is a cross-sectional view similar to FIG. 26 and showing attachment members closed relative to the steering wheel rim;

FIG. 28 is a plan view of another embodiment of a vehicle security device in accordance with the present invention;

FIG. 29 is an enlarged cross-sectional view taken along line 29—29 in FIG. 28;

FIG. 30 is a plan view of another vehicle security device in accordance with the present invention;

FIG. 31 is an enlarged cross-sectional view taken along line 31—31 in FIG. 30;

FIGS. 32 through 38 are plan views of other embodiments of vehicle security devices in accordance with the present invention;

FIG. 39 is an enlarged side view taken along line 39—39 in FIG. 38;

FIG. 40 is a plan view of yet another embodiment of a vehicle security device in accordance with the present invention;

FIG. 41 is a cross-sectional view taken along line 41—41 in FIG. 40;

FIG. 42 is a developed plan view of still another embodiment of a vehicle security device showing an armor belt in accordance with the present invention;

FIG. 43 is a sectional view of a vehicle security device shown in FIG. 42 and showing the device placed on a steering wheel rim;

FIG. 44 is a cross-sectional view taken along line 44—44 in FIG. 42;

FIG. 45 is a cross-sectional view similar to FIG. 44 and showing a modification of the vehicle security device;

FIG. 46 is a perspective view of another embodiment of a vehicle security device showing a fragmentary section of an armed endless band in accordance with the present invention;

FIG. 47 is a plan view of an armored endless band permanently secured to a steering wheel showing a vehicle security device in accordance with the present invention;

FIG. 48 is a cross-sectional view taken along line 48—48 in FIG. 47;

FIG. 49 is a cross-sectional view taken along line 49—49 in FIG. 46; and

FIG. 50 is a perspective view similar to FIG. 46 of another embodiment of a vehicle security device in accordance with the present invention.

DETAILED DESCRIPTION OF THE PREFERRED EMBODIMENTS

Figure 1:
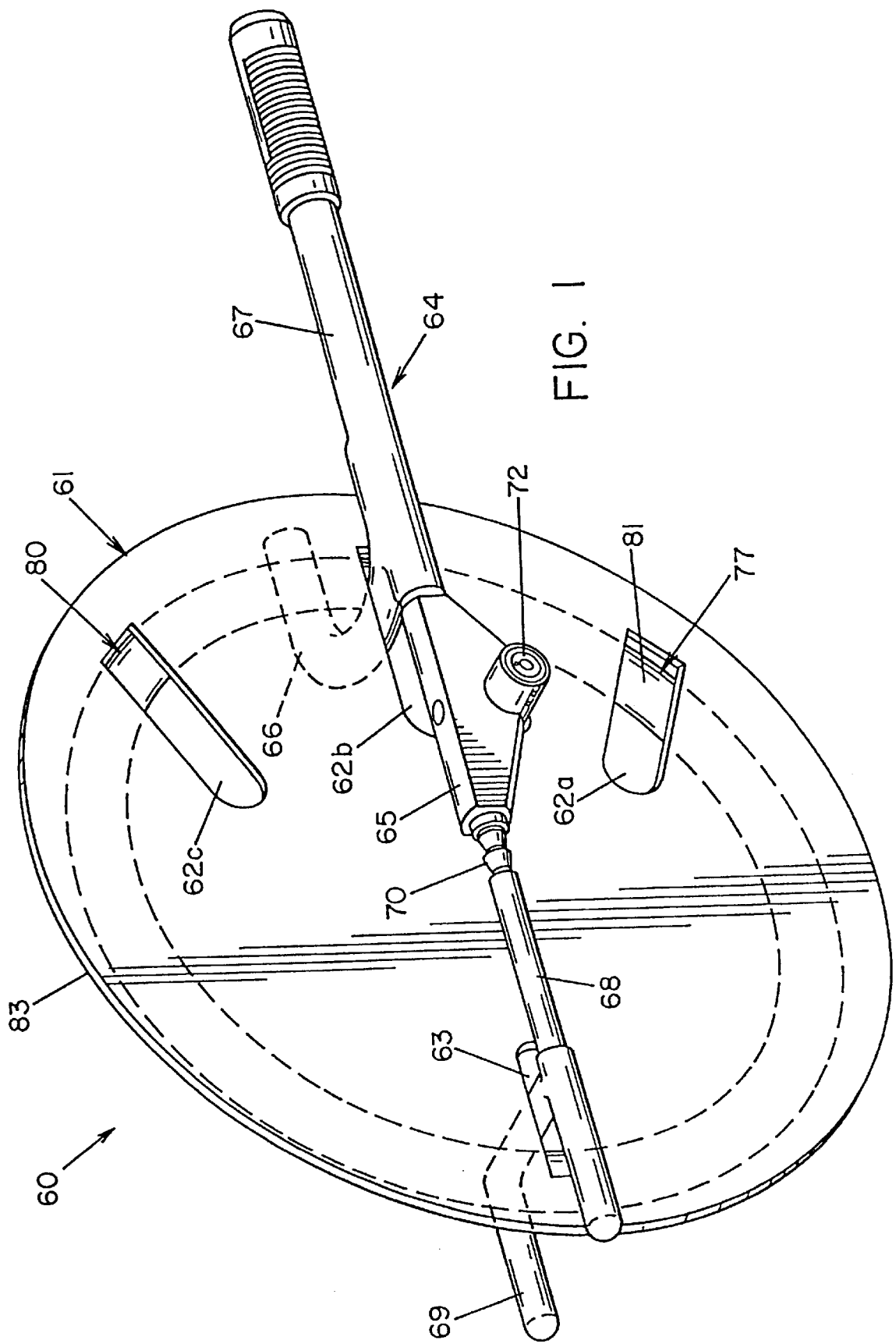
FIG. 1 is a perspective view of a vehicle security device in accordance with the present invention and showing the security device attached to a steering wheel by a cooperative mechanical anti-theft steering wheel lock.
Figure 11:
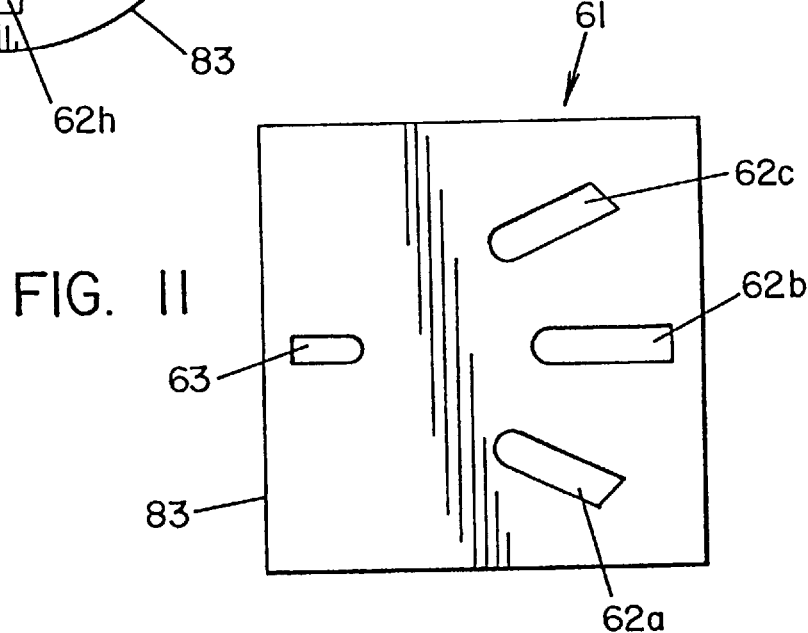
Figure 12:
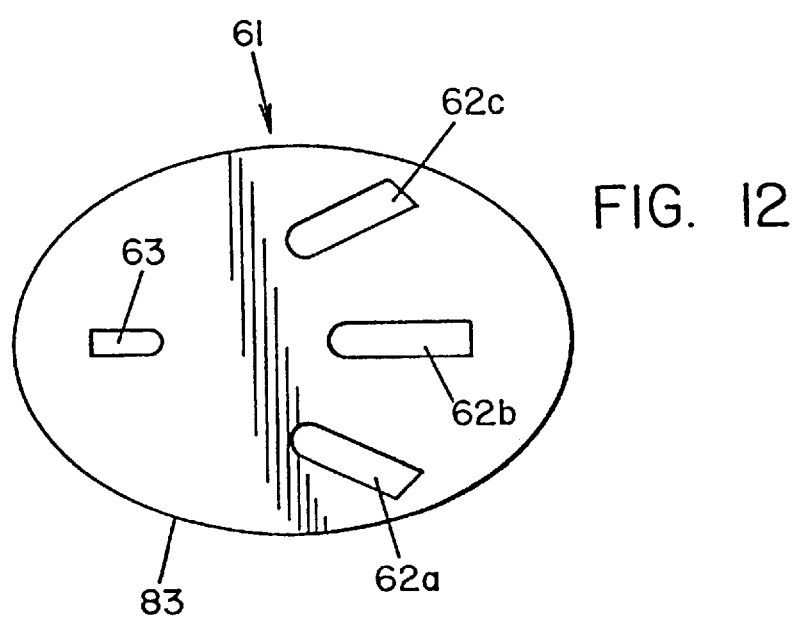

Referring now to the drawings wherein the showings are for the purpose of illustrating preferred embodiments of the invention only and not for the purpose of limiting the same, FIGS. 1–3 illustrate a vehicle security device 60 positioned on the face of a vehicle steering wheel 77. Steering wheel 77 includes a hub member 78 and at least one spoke member 79 connecting hub member 78 to steering wheel rim 80 which surrounds hub member 78. Steering wheel rim 80 lies in a plane and, preferably, hub member 78 lies in or recedes from the plane of steering wheel rim 80. Security device 60 is connected to steering wheel rim 80 by anti-theft steering wheel lock 64. Security device 60 is in the form of a protective plate member 61 which limits access to and protects against the cutting of steering wheel rim 80, and wheel lock 64 prevents full rotation of steering wheel 77. Protective member 61 is positioned over the face of steering wheel rim 80 such that security device 60 lies in a plane parallel to the plane of steering wheel rim 80. In this embodiment, protective member 61 is an annular plate or disk having a peripheral outer edge 83; however, the protective member can have other shapes such as square and oval, as illustrated in FIGS. 11 and 12. The peripheral outer edge portion of protective member 61 is placed over the surface 81 of rim 80. Preferably, as shown in FIGS. 1–3, peripheral outer edge 83 is spaced radially outward from the outer edge 82 of rim 80 to optimize the limiting of access to rim 80. Protective member 61 includes openings 62a, 62b, 62c and 63 therethrough and by which protective member 61 is attached to steering wheel 77 as set forth more fully hereafter. The placement of protective member 61 on rim 80 is such that it is very difficult to cut rim 80 without also having to cut protective member 61. Protective member 61 is of a material which cannot be readily cut, especially by a bolt cutter or hacksaw. Preferably, protective member 61 is made of a tempered steel having a thickness of about ⅛ inch. While not shown, protective member 61 is preferably coated with a non-abrasive substance, such as plastic, to protect steering wheel 77 from damage such as scratching which may occur during installation of protective member 61 onto steering wheel rim 80. The coating also provides corrosion protection.

As illustrated in FIGS. 1–3, protective member 61 is connected to steering wheel rim 80 by a steering wheel lock 64. Lock 64 is of the type shown in certain of the patents incorporated herein by reference and, as is well known, is comprised of a tubular body portion 67 and a lock housing 65, a rod member 68 which is dimensioned to move in telescopic fashion within body portion 67 and lock housing 65, key lock 72 which locks rod member 68 in position with respect to body portion 67 and lock housing 65, and two lock hooks 66 and 69 respectively positioned on body portion 67 and rod member 68. Rod member 68 includes grooves 70 which, as shown in the aforementioned patents, allow rod member 68 to ratchet into position in only one direction when key lock 72 is in the locked position. As illustrated in FIGS. 1 and 2, lock hooks 66 and 69 have a "U"-shaped design and are open outwardly relative to one another. Lock 64 is preferably made of a hardened steel which resists cutting by a saw or bolt cutter.

As illustrated in FIGS. 1–3, protective member 61 is connected to steering wheel rim 80 by lock 64. More particularly in this respect, protective member 61 is secured to steering wheel 77 by passing hook 66 through member opening 62b and about rim 80 and then ratchetly removing rod member 68 from body portion 67 and lock housing 65 until hook 69 can be passed through opening 63 and thence into engagement with the corresponding portion of rim 80. As illustrated in FIGS. 1–2, openings 62a and 62c are on circumferentially opposite sides of slot 62b on protective member 61. Openings 62a, 62b and 62c are of sufficient width and length to allow hook 66 to be passed therethrough and are radially located on protective member 61 adjacent to the region on the protective member which overlays rim surface 81 of rim 80. Opening 63 is located diametrically across from opening 62b and has sufficient width and length for hook 69 to be inserted therethrough. Openings 62a and 62c and preferably openings 62b and 63 do not extend to rim peripheral outer edge 83 in that the latter would expose rim 80 for cutting. As will be appreciated from the broken line position of wheel lock 64 in FIG. 2, openings 62a and 62c allow the wheel lock to be positioned at various locations on rim 80 while attaching protective member 61 to steering wheel 77. The multiple positionings of lock 64 allow for greater flexibility in fastening the lock to a variety of different steering wheel designs and shapes.

As is well known and apparent from FIGS. 1–2, body portion 67 of wheel lock 64 extends radially outwardly of rim 80 when mounted thereon and extends beyond rim peripheral outer edge 82 and protective member outer edge 83. As is further well known, such extension of body portion 67 is designed to be of sufficient length to engage either the interior of the vehicle or the operator when attached to steering wheel 77 to prevent the complete rotation of the steering wheel. Wheel lock 64, as described in the referenced patents herein, secures a vehicle against theft by not allowing the operator to steer the vehicle. Protective member 61 provides the additional security of further limiting access to and the cutting of steering wheel rim 80 to optimize the security against theft. Both lock 64 and protective member 61 are made of cut-resistant materials to protect against the cutting and/or disabling of the lock, protective member or steering wheel rim 80.

Referring now to FIGS. 4 and 5, there is illustrated a support member 90 by which protective member 61 is supported on wheel rim 80 prior to and during attachment thereto by wheel lock 64. Support member 90 is separate from protective member 61 and comprises a ring section 92 having a "U"-shaped design. One end of ring section 92 is provided with a trough section 94 and the other end is provided with a planar face section 96. The "U"-shaped design of ring section 92 is such that the latter will receive wheel rim 80. Support member 90 supports protective member 61 on steering wheel 77 by first positioning ring section 92 over the back of steering wheel rim 80 near the lower portion of the steering wheel such that trough section 94 and face section 96 are positioned adjacent the front face of the steering wheel. In this position, the trough section is positioned below the rim peripheral outer edge 82 and the face section is positioned above the rim inner edge 84. The edge 83 of protective member 61 is positioned in trough section 94 and the protective member rests against face section 96. Trough section 94 is designed to support the protective member and includes a "V"-shaped recess 95 receiving edge 83. Once protective member 61 is positioned into trough section 94, ring section 92 engages steering wheel rim 80 under the weight of the protective member. While support member 90 supports protective member 61 on steering wheel 77, lock hooks 66 and 69 of wheel lock 64 can be easily inserted through openings 62b and 63 to securely connect the protective member to the steering wheel. Once the protective member is connected to the steering wheel, support member 90 may be removed or left on steering wheel rim 80.

Referring now to the embodiment shown in FIGS. 6 and 7, protective member 61 includes at least one support tab 102 to support the protective member on steering wheel rim 80 prior to mounting wheel lock 64 thereon. Support tabs 102 are spaced inwardly from edge 83 of the protective member and extend from the protective member at an angle to the plane of the plate of the protective member. Preferably, the support tabs include a leg 104 which extends perpendicularly from the protective member and a leg 105 which angles or curves relative to leg 104. As illustrated in FIG. 6, protective member 61 has two support tabs 102 located near the lower portion of the protective member; however, any number of support tabs can be used and positioned in various locations on the protective member. As illustrated in FIGS. 6 and 7, the support tabs are positioned on the protective member such that when the protective member is positioned on the rim surface 81, legs 104 of support tabs 102 engage and rest upon inner edge 84 of the lower section of the steering wheel to support the protective member. While not shown, support tabs can also be positioned at the top of member 61 such that legs 104 rest upon outer edge 82 of the upper section of the steering wheel to support protective member 61. Preferably, tabs 102 are punched from the plate material of protective member 61 providing small tab holes 106 adjacent to each support tab 102. The tab holes allow an individual to easily view where the support tabs are being positioned on the steering wheel rim to facilitate easier installation. As illustrated by the broken lines in FIG. 6, wheel lock 64 can be easily assembled with protective member 61 while the support tabs support the protective member on the steering wheel.

Referring now to FIGS. 8 and 9, embodiments of the present invention are disclosed wherein protective member 61 is of a plastic material and includes a reinforced section 100 on and adjacent to the outer peripheral edge of the protective member. Reinforced section 100 preferably includes a cut-resistant material 101 embedded in the material of protective member 61. Material 101 may be steel or other cut-resistant material, and the provision thereof embedded in the plastic material of the protective member saves in cost and weight of the protective member without sacrificing structural integrity. As illustrated in FIG. 8, reinforced section 100 lies in the same plane as the protective member and extends beyond outer edge 82 of the steering wheel. The material 101 in the reinforced section can be thicker and thus provides additional vehicle security by increasing the difficulty in cutting through the protective member and rim 80. The increased thickness of the reinforced section also makes it more difficult to position a cutting tool such as a lock cutter about the steering wheel rim. FIG. 9 is a modification of FIG. 8 whereby the outer periphery of reinforced section 100 is curved relative to the plane of the protective member. The curved surface extends about outer edge 82 of the steering wheel rim to cover more of the rim and provide additional protection against the cutting of the steering wheel.

Figure 10:
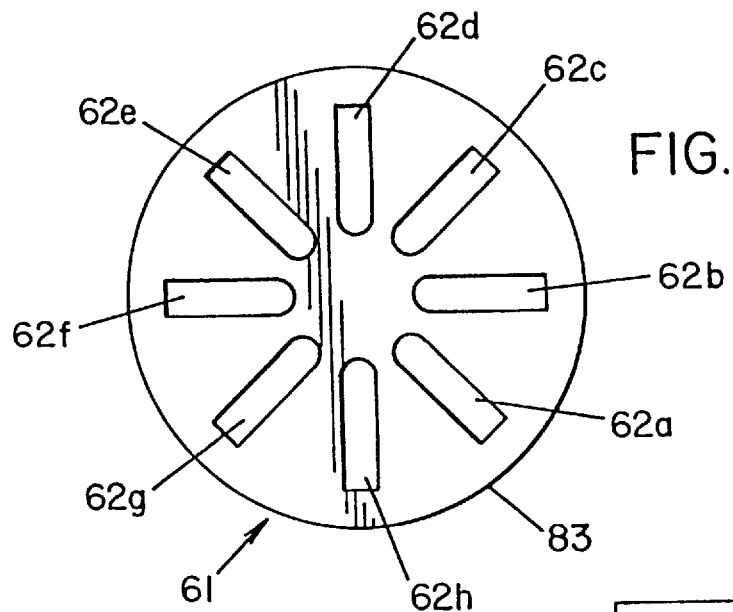
FIGS. 10 through 12 are plan views of further embodiments of vehicle security devices in accordance with the present invention.

Referring now to FIG. 10, protective member 61 is shown as containing eight protective member openings 62a–h. However, more of less openings can exist. The openings are all preferably the same shape and size and equally spaced apart. The openings are all designed such that hooks 66 and 69 of wheel lock 64 can be inserted into opposed pairs of the openings. The eight openings increases the versatility with respect to mounting mechanical security lock 64 in a variety of angular positions on protective member 61 to facilitate attachment to many different types of steering wheels.

Referring now to FIGS. 13–14, protective member 61 is shaped as an annular ring and has a large circular central opening 108 having a peripheral edge 109 radially inwardly of inner edge 84 of steering wheel rim 80, as illustrated in FIG. 14. The protective member is designed to cover the inner and outer edges of rim 80 as illustrated in FIG. 14. FIGS. 15 and 16 illustrate a modification of the protective member in FIG. 14. In this respect, the protective member includes a cross support structure 107 which forms four large triangularly shaped openings 107a–d. The cross support provides additional structural integrity to the ring of the protective member to assist in preventing unauthorized users from bending the protective member while it is secured to the steering wheel without significantly increasing the weight of the protective member. In a manner similar to FIG. 14, FIG. 16 shows the ring of the protective member providing protection for the steering wheel rim 80. The design of the protective member, which includes one or more large openings as illustrated in FIGS. 13–16, facilitates the easy installation of the protective member on the steering wheel and attachment of the protective member with the wheel lock. These designs advantageously provide for a lighter weight, more versatile protective member which is easily attachable to a variety of different steering wheel designs while supplying the required protection against severing of the steering wheel rim.

In the embodiments illustrated in FIGS. 17–24, protective member 61 is provided with a flange 110 connected to outer edge 83 of the protective member. The flange extends from the edge of the protective member at an angle to the plane of the protective member. The flange may extend partially or totally around edge 83 of the protective member. In particular, FIGS. 17 and 18 illustrate a modification of the embodiment of FIGS. 13 and 14 wherein protective member 61 is an annular ring. In FIGS. 17 and 18, flange 110 extends about 180° about the upper half of the protective member and, as illustrated in FIG. 18, flange 110 is arcuate in cross section so as to engage about the upper portion of outer edge 82 of rim 80 to support the protective member therein. FIGS. 19–24 illustrate modifications of the embodiment of FIGS. 1 and 2 wherein protective member 61 is an annular plate having openings 62a–c and 63 for receiving the hooks of wheel lock 64. In FIGS. 19–22, flange 110 completely encircles the outer periphery of the protective member and extends rearwardly therefrom. In the embodiment of FIG. 20, flange 110 is straight and extends tangently over the outer edge 82 of the rim, and in the embodiment of FIG. 22, flange 110 slightly curves about the outer edge of the rim. In the embodiments illustrated in FIGS. 17–22, the flange covers the radially outer surface of rim 80 and thus provides additional protection against cutting the rim and, at the same time, supports the protective member on the rim for easier connection to the steering wheel by wheel lock 64.

Referring now to FIGS. 23 and 24 which illustrate a modification of the embodiment in FIGS. 1 and 2, flange 110 extends forwardly from protective member 61. The flange extends about edge 83 and is interrupted at the locations therealong radially adjacent to openings 62a–c and 63. The interruptions in the flange adjacent to the openings allows the hooks on the wheel lock to be easily inserted into the holes and engaged with the rim. This flange configuration increases the difficulty of positioning a bolt cutter about the steering wheel rim 80 and protective member 61 thereby increasing the difficulty in cutting the rim. In the embodiments of FIGS. 17–24, flange 110 is rigidly attached to protective member 61 and preferably, as shown, is integral therewith. However, flange 110 could be separate from protective member and attached thereto by welding or bolting for example.

Referring now to FIGS. 25–27 which illustrate a modification of the security device of FIGS. 1 and 2, clamp members 111 are pivotably attached to outer edge 83 of protective member 61. Clamps 111 are attached to the protective member by corresponding hinges 112; however, the flange could be pivotably attached in some other way. Preferably, the clamps are positioned on edge 83 radially outwardly adjacent to openings 62a–c and 63 and extend beyond the circumferentially opposite ends of the openings. Each clamp is "U"-shaped and is designed to peripherally surround rim 80 behind the protective member as illustrated in FIG. 27. The clamp enhances protection against cutting of the steering wheel rim. As will be appreciated from FIG. 27, two of the clamps 111 are locked in place about rim 80 once the hooks of wheel lock 64 are inserted into the openings therefor and engage the rim. The hooks surround the clamps and prevent the latter from opening, thus further securing the protective member to the steering wheel. When the clamps are closed about rim 80, they partially cover the openings in the protective member which further limits access to the rim by unauthorized persons thereby providing additional security.

Referring now to FIGS. 28 and 29, another embodiment is shown wherein a protective member 120 is divided into two sections 121 whereby each section 121 comprises a flat semi-circular plate portion 122 having a corresponding peripheral flange 123 extending therefrom and providing support for the protective member on rim 80 and protection to rim 80 as described above with respect to FIG. 17–24. The plates have openings 124a–c and 125 positioned inwardly from edge 126 of the plates and which function for the same purpose as openings 62a–c and 63 respectively as described above with respect to FIGS. 1 and 2. Sections 121 are connected together by hinge 127; however, the sections can be connected together in other ways. Hinge 127 is located at the upper end of protective member 120 and is secured between the ends of the flanges 123 of each plate 122. Hinge 127 connects sections 121 such that the two sections can swing apart at the hinge as shown by the broken line positions in FIG. 28. The flange on each section 121 is preferably coextensive with the perimeter edge of the corresponding plate portion 122. The flange may be straight or curved to extend about the outer edge of the rim. Preferably, the flange is curved, as shown in FIG. 29, to better secure the protective member to the rim. Each section 121 includes a lock tab 128 connected to the corresponding flange diametrically opposite hinge 127. Preferably, the lock tabs are welded to the flange but can be attached by other ways or can be an integral part of the flange. Each lock tab includes a tab hole 129, and the lock tab on each section is positioned such that when the sections are swung together the tab holes line up and allow a lock 130 to be inserted through both holes for locking the two sections together, as illustrated in FIG. 28. While steering wheel rim 80 is not shown in FIG. 28, it will be appreciated that sections 121 of protective member 120 are swung apart on hinge 127 prior to attaching the protective member to the rim, as illustrated by the broken line positions thereof in FIG. 28. The sections must be so separated so that the curved flange 123 can be placed about the rim. The hinge is then placed on the upper portion of the rim and the sections are then swung together thereby securing the protective member to the rim. The curved flange engages the rim to support the protective member on the rim and prevent the removal of the protective member from the rim while the sections are together. Lock 130 is placed through holes 129 of tabs 128 to secure the sections together. Wheel lock 64 is easily attached to the protective member and rim by inserting hooks 66 and 69 through holes 124 and 125 in the manner described in conjunction with FIGS. 1 and 2.

FIGS. 30 and 31 illustrate a modification of the security device in FIGS. 28 and 29. In this respect, protective member 120 includes an elongated extension member 131 made of a cut-resistant material and attached to the flange 123 of one of the sections 121 to extend radially outward from the plates of the protective member. The extension member is welded to the flange of the one section, but may be attached in other ways. The extension member is preferably located on the flange midway between the lock tab and the hinge. Once the protective member is connected to the steering wheel rim, extension member 131 prevents the steering wheel from being completely rotated and thus functions in the same manner as the tubular body portion 67 of wheel lock 64 previously described in FIGS. 1 and 2.

FIGS. 32–39 illustrate modifications of the protective member shown in FIGS. 1 and 2, and by which protective member 61 is comprised of two or more sections 134 interengaged so as to be folded or disassembled to reduce the size of the protective member for easy storage. More particularly, the protective member can be divided into two, three or four sections, as shown in FIGS. 32, 36 and 34 respectively, and the sections are connected together by hinges 135 located inwardly from outer edge 83 of the protective member. The hinges are made of a cut-resistant material, and are preferably welded to the sections; however, the hinges may be attached in other ways. The hinges are positioned on the sections in a manner that facilitates easy folding of the sections. As illustrated in FIGS. 32 and 33, two hinges 135 are used to attach the two sections 134 together to allow the two sections to fold into an overlying relationship as shown in FIG. 33. In FIGS. 34 and 35, the protective member is divided into four quarter sections 134 defined by diametrical cut lines providing abutting edges therebetween. Three hinges 135 are used to connect the four sections and are alternately attached on the front and back of the sections at the abutting edges therebetween, as shown in FIG. 34, whereby the sections can be folded into an overlying relationship to reduce the protective member to a quarter of its size, as illustrated in FIG. 35. FIGS. 36 and 37 illustrate the protective member divided into three sections 134 by two parallel cut lines spaced on opposite sides of the center point of the protective member and providing abutting edges between the sections. Four hinges 135 are used to attach the three sections together such that the outer sections can be folded over the inner section and one another reducing the protective member to about one third its unfolded size, as illustrated in FIG. 37. Although not shown, one set of hinges 135 attaching an outer section to the inner section can be placed on the opposite side of the protective member with respect to the other set of hinges such that the outer sections are folded over opposite sides of the center section.

In FIGS. 38 and 39, two sections 134 are slidably connected together by a tongue and groove arrangement whereby the two sections can be separated from each other and conveniently stored. The tongue and groove arrangement is preferably a dove tail joint 136 which includes a tongue 137 on one section 134 which slides into groove 138 on the other section 134 to releasably lock the two sections together. While the dove tail arrangement is preferred, other slidably interengaging arrangements may be used. Although not shown, it will be appreciated that the protective members in FIGS. 32–39 may include flanges on the peripheral edge of the protective member similar to the flanges illustrated in FIGS. 17–27, support tabs as illustrated in FIGS. 6 and 7, reinforced sections as illustrated in FIGS. 8 and 9 and various other hinge arrangements. The protective member is connected to the steering wheel by unfolding or connecting the sections together and placing the protective member on the face of the steering wheel. A wheel lock, as illustrated in FIGS. 1 and 2 and described with reference thereto, is similarly attached to the steering wheel to connect the protective member and steering wheel rim.

Referring now to FIGS. 40–41, there is illustrated another embodiment of a security device in accordance with the present invention comprising a protective member 150 shaped as an annular ring and divided into two equal, semi-circular sections 152 and 154 having abutting and interengaging end edges. Each section 152 and 154 is generally semi-circular in cross section, whereby the two sections extend completely about the periphery of steering wheel rim 80 and surround a substantial portion thereof on opposite sides of outer edge 82. The end edges include tabs 158 on section 152 and slots 160 in section 154 which are shaped to receive the tabs, as illustrated in FIG. 41. The tab and slot arrangement maintains the abutting section ends together when the protective member is locked about the steering wheel.

A modified wheel lock 64a similar to the wheel lock described with reference to FIGS. 1 and 2, but modified to have no hooks, is directly attached to the protective member, preferably by welding the lock to the protective member. More particularly in this respect, rod member 68a is attached by weld 155 to section 154 centrally between the ends thereof, and body portion 67a is attached by weld 157 to section 152 between the ends thereof. The protective member is attached to rim 80 by unlocking lock 72a to allow rod 68a to be extended from body portion 67a thereby separating sections 152 and 154. One of the sections is then placed on the rim and the rod member and body portion are relatively displaced to move the rod member into the body portion until the other section engages the rim and the ends of the sections abut locking the sections together via the tab and slot, as shown in FIG. 41. Once the protective member is secured to the rim, the body portion of the wheel lock prevents the steering wheel from being completely rotated as described above in conjunction with FIGS. 1 and 2.

Referring now to FIGS. 42–45, another embodiment of the security device is shown wherein a protective member 170 is made of a flexible cut-resistant material in the shape of an elongated belt 172 having two slightly wider belt ends 174. The flexible material is preferably a wire mesh 176 and the mesh is folded over at the sides and ends of the protective member to form a reinforced hem 178 as shown in FIG. 44. The belt ends each have four belt holes 180 located inwardly from hem 178. Preferably, the holes are reinforced by rings 181 to maintain the hole shape and prevent damage to the wire mesh. FIG. 45 illustrates a modification of the belt wherein a cover 182 is applied about the wire mesh to reinforce the wire mesh and protect the mesh from damage. The mesh cover is preferably a plastic coat in which the wire mesh is embedded such as, for example, by dipping the mesh in a hot liquid plastic bath. The protective member is wrapped about rim 80 and connected to the rim by overlapping belt ends 174 and connecting the ends together via mounting a wheel lock 64 through the belt holes 180. A wheel lock 64 similar to one described in conjunction with FIGS. 1 and 2 is attached to rim 80 wherein hooks 66 and 69 engage the protective member and rim to more securely attach the protective member to the rim and prevent the steering wheel from being completely rotated. The mesh belt about the rim resists cutting to deter severing of the rim and thus prevent removal of the wheel lock. Advantageously, the belt can be permanently mounted on the steering wheel rim, whereby it is only necessary to apply wheel lock 64 to obtain maximum security.

FIGS. 46–49 illustrate another modification of the protective member shown in FIG. 42 and by which a cable lace 184 is permanently attached along one side of the band 170. In this embodiment, mesh 176 is coated on one side thereof with a plastic layer 183 and wherein plastic layer 183 includes at least one cable 186 running through the full length of the plastic layer 183, as shown in FIG. 49. The cable is made of a cut-resistant material, preferably a steel cable, which resists cutting by a bolt cutter or hacksaw, thereby enhancing the security against severing the covered rim. FIG. 50 is a further modification of the band shown in FIG. 46 and by which mesh 176 is embedded in plastic material 182 without any reinforcement along the edges of the band.

The invention has been described with reference to the preferred embodiments. It will be appreciated that modifications or alterations which would not deviate from the present invention will occur to others upon their reading and understanding of the specification. It is intended that all such modifications or alterations be included insofar as they come within the scope of the invention as claimed or equivalents thereof.

I claim:

1. A vehicle security device for protecting a steering wheel rim comprising a steering wheel cover adapted to be used with a lock, said steering wheel cover comprising a protective face plate formed of a cut resistant material and designed to overlie a majority of a front face of said steering wheel rim, said face plate including at least two openings and at least one flange attached to a peripheral edge of said face plate, said at least one flange designed to cover at least a part of an outer surface of said steering wheel rim when said face plate is positioned onto said steering wheel rim, each of said at least two openings provided in said face plate such that each opening is at least closely adjacent to said steering wheel rim when said face plate is positioned onto said steering wheel rim and said at least two openings adapted to receive a hook member on a lock which hook members formed to secure said steering wheel cover to said steering wheel rim.

2. A device as defined in claim 1, wherein said protective face plate is substantially circular in shape and has a diameter at least as large as the diameter of said steering wheel rim.

3. A device as defined in claim 2, wherein said face plate is divided into a least two plate sections, said face plate including means for connecting together said at least two plate sections.

4. A device as defined in claim 2, wherein at least one of said at least two openings at least partially overlie said steering wheel rim when said face plate is positioned on said steering wheel.

5. A device as defined in claim 4, wherein said each of said at least two openings spaced substantially diametrically apart and spaced from the edge of said face plate at substantially equal distances.

6. A device as defined in claim 4, wherein at least one of said openings is oblong in shape.

7. A device as defined in claim 5, wherein at least one of said openings is oblong in shape.

8. A device as defined in claim 7, wherein at least one of said at least two openings at least partially overlie said steering wheel rim when said face plate is positioned on said steering wheel.

9. A device as defined in claim 8, wherein each of said openings is positioned to overlie said rim when said face plate is attached to said steering wheel.

10. A device as defined in claim 1, wherein said face plate is divided into at least two plate sections, said face plate including means for connecting together said at least two plate sections.

11. A device as defined in claim 10, wherein at least one of said at least two openings at least partially overlie said steering wheel rim when said face plate is positioned on said steering wheel.

12. A device as defined in claim 10, wherein said each of said at least two openings spaced substantially diametrically apart and spaced from the edge of said face plate at substantially equal distances.

13. A device as defined in claim 1, wherein at least one of said at least two openings at least partially overlie said steering wheel rim when said face plate is positioned on said steering wheel.

14. A device as defined in claim 13, wherein said each of said at least two openings spaced substantially diametrically apart and spaced from the edge of said face plate at substantially equal distances.

15. A device as defined in claim 13, wherein at least one of said openings is oblong in shape.

16. A device as defined in claim 14, wherein at least one of said openings is oblong in shape.

17. A device as defined in claim 1, wherein said each of said at least two openings spaced substantially diametrically apart and spaced from the edge of said face plate at substantially equal distances.

18. A device as defined in claim 1, wherein at least one of said openings is oblong in shape.

19. A device as defined in claim 1, wherein each of said openings is positioned to overlie said rim when said face plate is attached to said steering wheel.

20. A vehicle security device for protecting a steering wheel comprising a steering wheel cover adapted to be used with a lock, said steering wheel cover comprising a protective face plate formed of a cut resistant material and designed to overlie at least a majority of a front face of a rim of said steering wheel, said face plate having a peripheral edge and including at least two openings and at least one flange attached to said peripheral edge of said face plate, said at least one flange adapted to cover a part of a peripheral edge of said rim when said face plate is positioned onto said steering wheel, each of said at least two openings provided in said face plate and positioned inwardly from said peripheral edge of said face plate and positioned such that at least a part of each of said at least two openings is at least closely adjacent to said rim when said face plate is positioned onto said steering wheel, at least one of said at least two openings adapted to receive a hook member on a lock which member is formed to secure said steering wheel cover to said steering wheel.

21. A device as defined in claim 20, wherein said protective face plate is substantially circular in shape and has a diameter at least as large as the diameter of said steering wheel rim.

22. A device as defined in claim 21, wherein said face plate is divided into at least two plate sections, said face plate including means for connecting together said at least two plate sections.

23. A device as defined in claim 22, wherein at least one of said at least two openings at least partially overlie said steering wheel rim when said face plate is positioned on said steering wheel.

24. A device as defined in claim 23, including a lock being attached to said wheel cover.

25. A device as defined in claim 23, including a lock, said lock being a separate component from said steering wheel cover.

26. A device as defined in claim 24, wherein said lock includes an elongated member, said elongated member adapted to prevent full rotation of said steering wheel when said lock and said steering wheel cover are secured to said steering wheel.

27. A device as defined in claim 25, wherein said lock includes an elongated member, said elongated member adapted to prevent full rotation of said steering wheel when said lock and said steering wheel cover are secured to said steering wheel.

28. A device as defined in claim 26, wherein said lock includes at least two hook members, each of said hook members adapted to extend through at least one of said openings in said face plate and at least closely engage at least a portion of said rim of said steering wheel.

29. A device as defined in claim 27, wherein said lock includes at least two hook members, each of said hook members adapted to extend through at least one of said openings in said face plate and at least closely engage at least a portion of said rim of said steering wheel.

30. A device as defined in claim 28, wherein said lock includes two telescopically engaging rods wherein each rod includes at least one hook member.

31. A device as defined in claim 29, wherein said lock includes two telescopically engaging rods wherein each rod includes at least one hook member.

32. A device as defined in claim 20, wherein said face plate is divided into at least two plate sections, said face plate including means for connecting together said at least two plate sections.

33. A device as defined in claim 32, wherein at least one of said at least two openings at least partially overlie said steering wheel rim when said face plate is positioned on said steering wheel.

34. A device as defined in claim 20, wherein at least one of said at least two openings at least partially overlie said steering wheel rim when said face plate is positioned on said steering wheel.

35. A device as defined in claim 20, including a lock being attached to said steering wheel cover.

36. A device as defined in claim 20, including a lock, said lock being a separate component from said steering wheel cover.

37. A device as defined in claim 20, including a lock, said lock includes an elongated member, said elongated member adapted to prevent full rotation of said steering wheel when said lock and said steering wheel cover are secured to said steering wheel.

38. A device as defined in claim 37, wherein said lock includes at least two hook members, each of said hook members adapted to extend through at least one of said openings in said face plate and at least closely engage at least a portion of said rim of said steering wheel.

39. A device as defined in claim 38, wherein said lock includes two telescopically engaging rods wherein each rod includes at least one hook member.

40. A device as defined in claim 39, wherein said hook members are facing substantially diametrically apart.

41. A vehicle security device adapted to limit access to a steering wheel which steering wheel includes a rim having a front face, a back face, an inner edge, an inner edge radius, and an outer edge, said security device comprising a cut resistant face plate lying in a plate plane and designed to overlie at least a majority of a front face of said steering wheel rim, said face plate including two plate sections and a plate connection to rotatably connect said two plate sections in said plate plane and to a secure position, said face plate overlying a majority of said front face of said rim when said plate sections are in said secure position, each of said plate sections including an opening and a flange, said flange attached to a peripheral edge of said plate section and adapted to cover at least a part of said outer edge of said rim when said face plate is positioned onto said steering wheel rim, each of said openings positioned inwardly from said peripheral edge of each of said plate sections and at least closely adjacent to said steering wheel rim when said face plate is positioned onto said steering wheel rim, said opening on one plate section positioned in a non-overlapping relationship with said opening on said other plate section when said face plate is in said secured position.

42. A device as defined in claim 41, wherein at least one of said openings at least partially overlie said steering wheel rim when said face plate is positioned in said secure position on said steering wheel.

43. A device as defined in claim 42, wherein said each opening spaced substantially diametrically apart when said face plate is positioned in said secure position.

44. A device as defined in claim 43, including a lock adapted to secure said face plate to said steering wheel cover.

45. A device as defined in claim 44, wherein said lock includes an elongated member and at least two hook members, said elongated member adapted to prevent full rotation of said steering wheel when said lock and said steering wheel cover are secured to said steering wheel.

46. A device as defined in claim 45, wherein said lock includes at least two hook members, each of said hook members adapted to extend through at least one of said openings in said face plate and at least closely engage at least a portion of said rim of said steering wheel.

47. A device as defined in claim 41, wherein said openings spaced substantially diametrically apart when said face plate is positioned in said secure position.

48. A device as defined in claim 41, including a lock adapted to secure said face plate to said steering wheel cover.

49. A vehicle security device adapted to limit access to a steering wheel which steering wheel includes a rim having a front face, a back face, an inner edge, an inner edge radius, and an outer radius, said security device comprising a cut resistant face plate lying in a plate plane and plate attacher to connect said face plate to said steering wheel, said face plate including at least two plate sections and a plate section connector to connect together each of said plate sections, each of said plate sections including an edge having a first end and a second end and an outer arc of a given radius connected to at least one end of said edge to form an outer peripheral edge of each plate section, said outer arc of each of said plate sections having a given radius at least equal to said inner edge radius of said steering wheel, said plate section connector providing independent rotation of each of said plate sections in said plate plane between a secured and an unsecured position, said plate attacher including an opening on each of said plate sections and positioned inwardly from said outer peripheral edge of each of said plate sections and spaced on each of said sections to be in a non-overlapping relationship with an opening of an adjacent plate section when said plate sections are in said secured position, at least one of said plate sections including flange means attached to the outer peripheral edge of said plate section, said flange means being attached to substantially the entire peripheral edge of said plate section, said plate attacher including means adapted to extend through each of said openings and about the inner edge of said steering wheel.

50. A device as defined in claim 49, wherein said face plate has two plate sections.

* * * * *